Nov. 18, 1930.

F. W. GAY 1,782,263

MEANS AND METHOD OF CONNECTING ELECTRICAL MACHINES WITH TRANSFORMER BANKS
BY PHASE CHANGING AND VOLTAGE CHANGING

Original Filed Feb. 15, 1928　　4 Sheets-Sheet 1

Fig.1

INVENTOR.
FRAZER W. GAY
BY Charles E. Tullar
HIS ATTORNEY

Nov. 18, 1930.                                                        1,782,263
F. W. GAY
MEANS AND METHOD OF CONNECTING ELECTRICAL MACHINES WITH TRANSFORMER BANKS
BY PHASE CHANGING AND VOLTAGE CHANGING
Original Filed Feb. 15, 1928      4 Sheets-Sheet 2

Fig. 1a.

INVENTOR.
FRAZER W. GAY
BY Charles E. Tullar
HIS ATTORNEY.

Fig. 2a.

INVENTOR.
FRAZER W. GAY

Patented Nov. 18, 1930

1,782,263

UNITED STATES PATENT OFFICE

FRAZER W. GAY, OF NEWARK, NEW JERSEY, ASSIGNOR TO GENERAL ELECTRIC COMPANY, A CORPORATION OF NEW YORK

MEANS AND METHOD OF CONNECTING ELECTRICAL MACHINES WITH TRANSFORMER BANKS BY PHASE CHANGING AND VOLTAGE CHANGING

Application filed February 15, 1928, Serial No. 254,560. Renewed June 18, 1930.

This invention relates to means and methods for connecting electrical machines with transformer banks and has for its principal object to provide an improved means of interconnecting large alternating current machines to their transformer banks whereby a plurality of uniformly distributed, separately insulated machine windings each differing from the others in the time phase of its generated E. M. F. feed a plurality of separately insulated transformer primaries in separately insulated relation; thereby allowing a number of grounds or crossed circuits to occur in the windings without developing a short circuit through which damaging current will flow.

In my application Serial No. 196,218, filed June 3, 1927, and my application Serial No. 224,811, filed October 8, 1927, both of which have been assigned to the same assignee as this application, I have described and claimed winding arrangements herein shown for obtaining a multiplicity of separately insulated and mechanically spaced circuits whereby voltage segregation may be obtained in the machine windings and in the machine coils. The present invention relates to a modification utilizing phase changing and phase modifying means with winding arrangements of the type claimed in the aforementioned applications.

In the preferable form all machine windings are identical in number of coils, size of conductor, insulation etc., and likewise all separately insulated transformer primaries are indentical in construction. Those machine coils feeding transformer primaries on a common magnetic circuit have the time phase of their generated E. M. F.'s brought to the same time phase by time phase changing means where necessary. Those machine windings having generated E. M. F.'s most nearly in the same time phase feed primaries on a common magnetic circuit.

If there are only two machine windings per transformer magnetic circuit then said two windings are connected through phase changing coils in such a manner that the time phase of the generated E. M. F. in each of said windings after passing through the phase changing coils is brought to a time phase value midway between the time phases generated in the two windings. The numerical value of the E. M. F. in each circuit at the terminals of its transformer primary is the same and no E. M. F. changing means is required.

If there are three machine windings per transformer magnetic circuit then it is obvious that one of these windings must generate E. M. F. of time phase midway between the time phase of the E. M. F.'s generated by the other two and it is only necessary to bring the time phase of the E. M. F.'s generated in these other two windings to this common time phase value generated by the third winding.

My invention will be better understood when taken in connection with the accompanying drawings and its scope will be pointed out in the appended claims.

In the accompanying drawings

Figure 1:
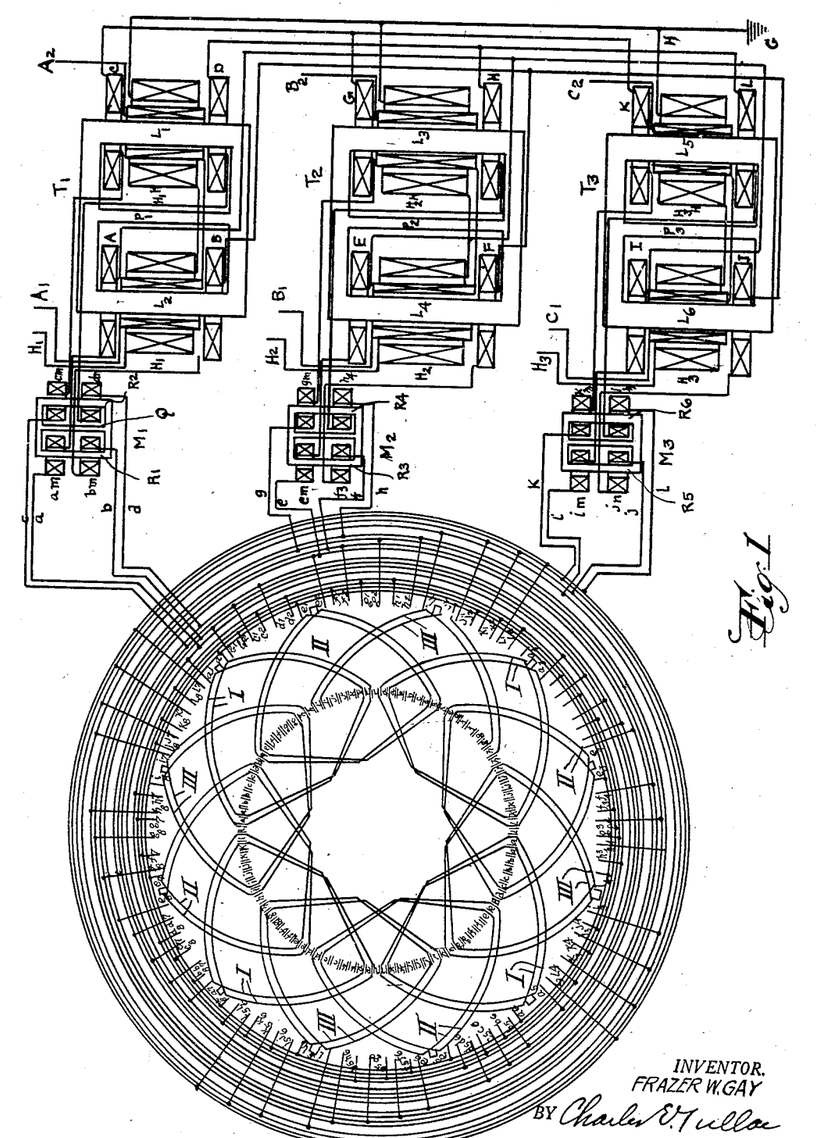
Fig. 1 is a digrammatic illustration of an embodiment of my invention wherein a three-phase generator is provided with a multiplicity of independent windings which are connected to a corresponding number of independent windings of three single-phase transformers, Fig. 1ª is a simplified very diagrammatic representation of the machine windings and transformer windings and the relation of the phase changing means thereto as shown in more detail in Fig. 1.
Figures 2, 3, 4:
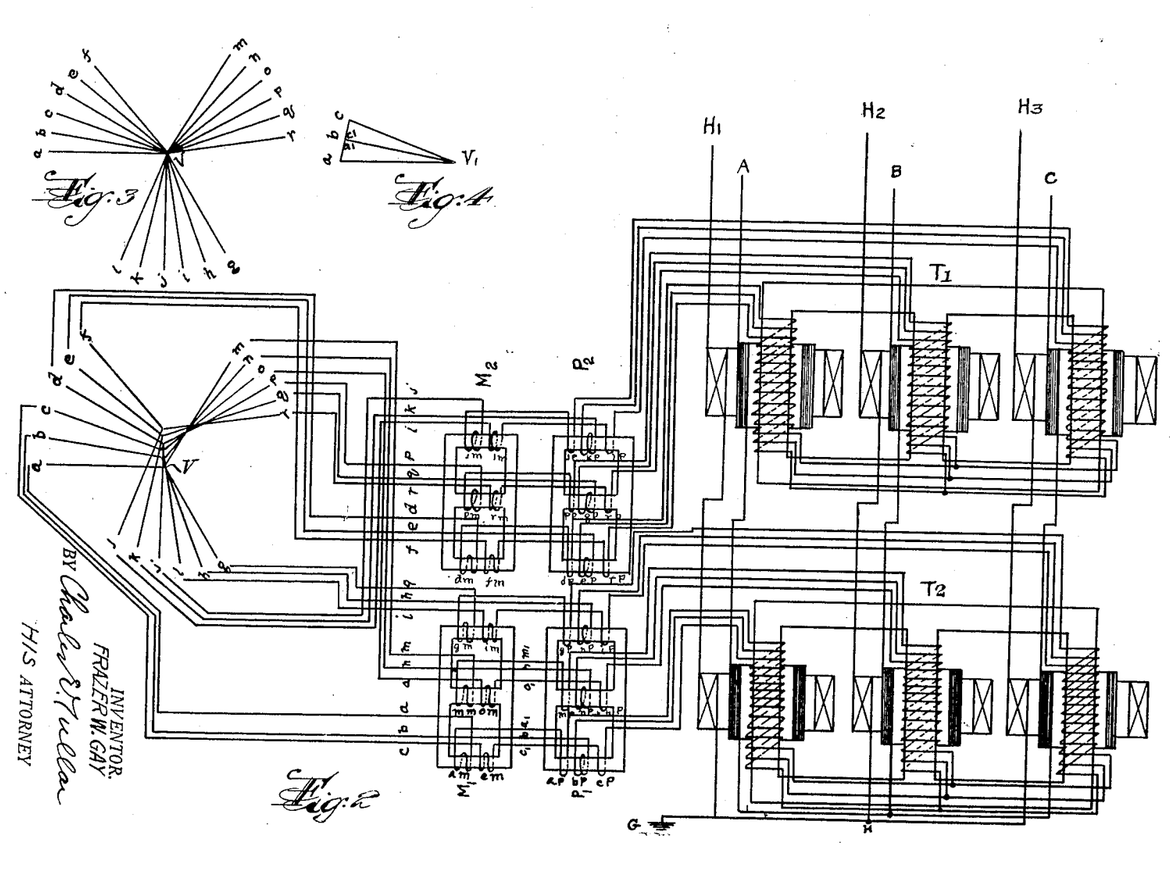
Fig. 2 is a modification of the embodiment of my invention illustrated in Fig. 1 and shows six independent three-phase windings having independent neutrals and connected to a corresponding number of independent windings on three-phase transformers, through means for modifying both the magnitude and phase relation of the various generator windings, Fig. 2ª is a simplified very diagrammatic representation of the machine windings and transformer windings and the relation of the phase changing means and voltage changing means thereto as shown in more detail in Fig. 2.
Fig. 3 is a vector diagram illustrating the phase relations between the voltages of the various independent windings of the generator shown in Fig. 2.
Fig. 4 is an explanatory diagram taken with reference to Fig. 3 for illustrating the variation in the magnitude of the voltage vectors modified by the phase changing means utilized in the embodiments illustrated in Figs. 1 and 2.

Before describing Figs. 1 and 2 in detail, it seems expedient to consider briefly Figs. 3 and 4 in regard to the effect of the phase changing coils. In Fig. 4 it will be seen that the numerical value of the E. M. F. in the two windings after passing through the phase changing coils is less than the numerical value of the E. M. F. in the winding requiring no phase changing, i. e. the act of phase changing has reduced the value of the E. M. F. at the corresponding transformer primaries in the circuits subject to phase changing. The vectors $V_1 a$, $V_1 b$ and $V_1 c$ represent the numerically equal but vectorially spaced E. M. F.'s generated in three machine windings feeding primaries on a common magnetic circuit. Vector $a a_1$ represents the E. M. F. induced in the phase changing coil connected in $V_1 a$ circuit and $V_1 a_1$ represents the E. M. F. of this circuit after phase changing. Likewise $V_1 c_1$ represents the E. M. F. in the $V_1 c$ circuit after phase changing.

A study of Fig. 4 shows that the E. M. F. induced in any phase changing coil must be proportional to the sine of the angle by which the time phase of the E. M. F. of its connected generator winding differs from the common E. M. F. time phase of its group while the numerical value of its E. M. F. after phase changing is proportional to the cosine of said angle. I do not wish to be limited to two or three coils in a group feeding primaries on a common magnetic circuit. It is to be noted that if the number of windings in a group is even, each such winding will require a connected phase changing coil on the common group phase changing magnetic circuit having a number of turns proportional to the sine of the angle by which the generated E. M. F. of its connected machine winding differs in time phase from the common E. M. F. time phase of the group, and phase changing coils of the same number of turns will be so connected that the E. M. F.'s produced by the power currents in them will mutually cancel. It is also to be noted that if the number of separately insulated windings per group, feeding transformer primaries on a common magnetic circuit is odd, then there is a machine winding in the group whose generated E. M. F. is in time phase with the average time phase of the generated E. M. F's of the group and this winding does not have to have its time phase changed by time phase changing means. The remainder of the windings in the group may have the time phase of their generated E. M. F's brought to the common time phase value of the odd winding by connected phase changing means as described above for the case when there are an even number of separately insulated windings per group.

Now it is evident that each machine circuit in any group after having the time phase of its generated E. M. F. brought to the common time phase of the group, if necessary, can be connected directly to one of the separately insulated primaries on a common magnetic circuit provided the number of turns on said primary is proportional to the cosine of the angle by which the time phase generated in its connected machine winding differs from the common time phase of its group. If it is desired to have all the primaries wound with the same number of turns then E. M. F. changing means may be used to bring the numerical value of the E. M. F. generated in machine windings and altered by phase changing to the common numerical value of the E. M. F. induced in the connected equal turn transformer primaries.

Now in my application for Letters Patent, Serial No. 196,218, filed June 3, 1927, and assigned to the same assignee as this application, I have pointed out more in detail the disadvantages inherent in modern methods of connecting large electrical machines and the advantages to be obtained by the construction indicated above. The results which I obtain by applying the means which I describe in more detail below are substantially the same as the above results obtained in my application above mentioned, but the means are very different as briefly set forth above and as described more in detail below.

Referring to Fig. 1 of the drawings I have shown a four-pole three phase generator having separately insulated machine windings connected to the separately insulated primaries of single phase transformer $T_1$, $T_2$ and $T_3$. The generator is arranged to be provided with eight coils per pole per phase with all coils connected together in pairs. Each coil in a pair is connected to its neighbor in that pair in series E. M. F. additive relation. There are thus formed four pairs of coils per pole, per phase as shown. Each pair of coils having a given position under one pole is shown connected in multiple with a similarly located pair of coils having a common E. M. F. time lease therewith under each of the other poles to form one of the phases of a separately insulated three phase winding. For example, consider the upper left hand quadrant as viewed in the drawing of the circle diagrammatically representing the armature core and indicated by the slots $a, a$; $b, b$; $c, c$; etc. The pair of coils threading slots $a, a$, in the lower half of this quadrant, which for purposes of illustration may be designated as phase I, are connected to the bus ring which is connected to the conductor $a$, leading to the phase changing transformer. Every fourth pair of coils occupying a similar position proceeding in a clockwise direction, as viewed in the drawing, is connected in parallel with the first coil mentioned through the same bus ring to form one of the phases, herein designated as phase I for purposes of explanation, of the phases of the separately insulated three phase winding.

Phase changing transformers $M_1$, $M_2$ and $M_3$ are used to change the time phase of the E. M. F. generated in each winding so that alternate windings have their generated E. M. F.'s retarded in time phase and the remaining alternate windings have their generated E. M. F.'s accelerated in time phase. By this means pairs of adjacent windings have the time phase of their generated E. M. F. brought to a common time phase value. For instance coils $a\ m$ and $b\ m$ in phase changing device $M_1$ each have the same number of turns and are mounted on the magnetic leg $R_1$ and connected in such a manner that the M. M. F. produced of equal energy currents fed by machine windings lettered $a$ and $b$ to the transformer primaries A and B and thus to the high voltage secondary $H_1$ neutralize each other and do not produce a magnetic flux in the magnetic leg $R_1$ but any circulating current through these coils will cause a current to flow in one of these changing coils 180° out of phase with the current that flows in the other coil and the M. M. F.'s produced by these currents will be additive to produce magnetic flux in the common magnet by $R_1$. Any current in one phase changing coil $a\ m$ on magnetic current $R_1$ which is not balanced by a current in the other phase changing coil $b\ m$ on the common magnetic leg $R_1$ both in value and time phase will set up a flux in said common magnetic leg $R_1$. This flux will oppose the voltage tending to circulate said unbalanced current and hold said current to that value necessary to excite said magnetic leg of said phase changing means.

In the same manner the windings lettered $c$ and $d$ have the time phase of their E. M. F. brought to a common time phase value by time phase changing coils $c$, and $d\ m$ on the common magnetic leg $R_2$.

Now it is evident that the arithmetic sum of the E. M. F.'s induced in the phase changing coils $a\ m$ and $b\ m$ will be substantially equal to the vector difference in E. M. F. between the E. M. F. generated in the machine winding $a$ and that generated in the machine winding $b$ and the arithmetic sum of the E. M. F. generated in the coils $c\ m$ and $d\ m$ will be substantially equal to the vector difference $m$ E. M. F. between the E. M. F. generated in the machine windings $c$ and $d$. It is therefore evident that the magnetism in the leg $R_1$ will differ in time phase from the magnetism in the leg $R_2$ by the same amount as the E. M. F. mean time phase of machine windings lettered $a$ and $b$ differs from the E. M. F. mean time phase of machine windings lettered $c$ and $d$, that is, by as much as the magnetism in leg $L_1$ differs in time phase from the magnetism in leg $L_2$ of transformer $T_1$. It is also evident that that part of the magnetic flux common to coils $a\ m$—$b\ m$ and $c\ m$—$d\ m$ will flow through all said coils in series while that part of the flux not common to $a\ m$—$b\ m$ and $c\ m$—$d\ m$ will flow through the leakage path Q. In the same manner the leakage path $P_1\ m$ the transformer $T_1$ carries that part of the flux in the transformer $T_1$ not common to both the primaries A—B and C—D.

Figure 1A:
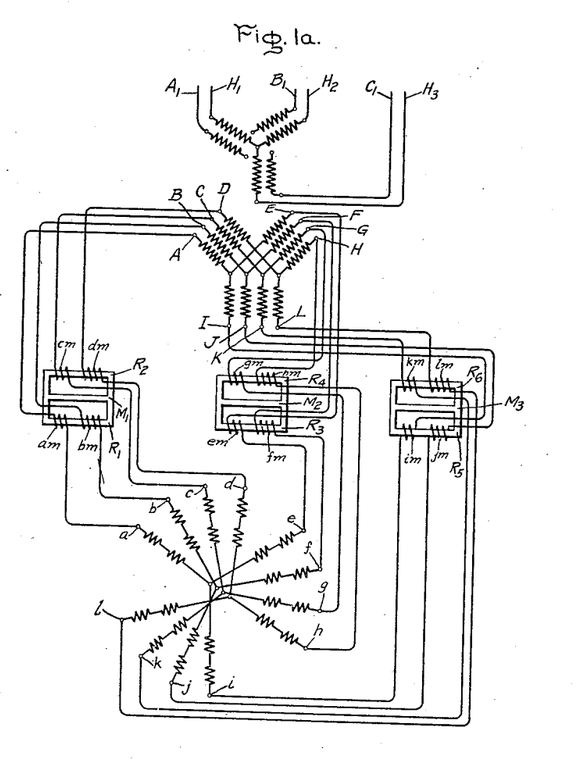

In Fig. 1$^a$ of the drawings I have shown very diagrammatically the general connections of the windings to facilitate an understanding of the circuit arrangements by a cursory examination of the drawings. For purposes of simplification I have shown only two coils per pole per phase, and the various groups in corresponding phases are designated in a similar manner to the corresponding windings in Fig. 1, namely, $a$, $b$, $c$, $d$; $e$, $f$, $g$, $h$; and $i$, $j$, $k$, $l$. These generator circuits are connected through phase changing means designated by $M_1$, $M_2$ and $M_3$ to corresponding separately insulated transformer windings designated as A, B, C, D; E, F, G, H and I, J, K, L. For purposes of simplification the transformer cores have been omitted since the winding arrangement on the cores is shown in detail in Fig. 1. The high voltage windings are connected to supply power to the three-phase high voltage distribution circuit $H_1$, $H_2$ and $H_3$. The tertiary winding is designated by the same terminal designations as in Fig. 1, namely $A_1$, $B_1$ and $C_1$.

In Fig. 2 I have shown diagrammatically an armature winding having six separately insulated three phase windings with neutrals spaced slightly apart to indicate more clearly that they are separately insulated and do not have a common electrical neutral. The vector relation of the E. M. F.'s generated in the windings is shown in Fig. 3. These windings are shown connected through phase changing means $M_1$ and $M_2$ and voltage changing means $P_1$ and $P_2$ to three phase transformers $T_1$ and $T_2$. In accordance with my invention the three phase circuit $a\ m\ g$ and the three phase circuit $c\ o\ i$ both have the time phase of their generated E. M. F. brought to a common time phase changing means $M_1$. It is also evident that this common time phase is the time phase of the E. M. F. generated by the winding $b\ n\ h$. This will be made clear by considering one phase only of each separately insulated three phase winding as shown in Fig. 4. The vectors $V_1\ a$, $V_1\ b$ and $V_1\ c$ represent the voltages generated in the phase windings $a$, $b$ and $c$ respectively. The vectors $a\, a_1$ and $c\, c_1$ represent the voltages generated in the phase changing coils $a\, m$ and $c\, m$. Now it is evident that the E. M. F. vectors $V_1 a_1$ and $V_1 c_1$ are of common time phase and have the same time phase as the vector $V_1 b$. If the vectors $V_1 a$, $V_1 b$ and $V_1 c$ are represented by unity then $V_1 a_1$ and $V_1 C_1$ equal to the cosine of the angle by which the time phase of the E. M. F. generated in their connected machine windings differ from the common time phase of the group of three windings i. e. in this case 10 electrical degrees, $V_1 a_1$ and $V_1 C_1$ are therefore approximately 1.5% less in numerical value than $V_1 b$. To bring the three E. M. F.'s to a common E. M. F. value these three circuits are shown passed through the separately insulated E. M. F. changing coils $a\, p$, $b\, p$ and $c\, p$ respectively on one leg of the E. M. F. changing means $P_1$. The machine winding $V_1 b$ is connected in series with the coil $b\, p$. Coil $b\, p$ has twice as many turns as the coil $a\, p$ or the coil $e\, p$. The connection of the circuits identified by the terminal designations $a$, $b$ and $c$ is such that if equal energy current is flowing through each to the transformer $T_2$, then the M. M. F. produced by the energy current flowing in coil $b\, p$ is exactly neutralized by the sum of the M. M. F.'s produced by the energy currents flowing in the coils $a\, p$ and $c\, p$; but if an excess current flows in any of said coils then the M. M. F. produced in the coil by this excess current will produce a flux in its core leg. This flux will induce a voltage in said coils sufficient to limit said excess current to a value required to excite said E. M. F. changing leg. It is evident that the E. M. F. of circuit $b$ will be reduced substantially twice as much as the E. M. F. of circuit $a$ and circuit $c$ are increased. Therefore the E. M. F.'s impressed on the separately insulated primaries of the transformer $T_2$ are of substantially the same numerical value and of substantially the same time phase.

In like manner it can be shown that the three phase separately insulated windings $d\, p\, j$, $e\, q\, k$ and $f\, r\, l$ may each feed separately insulated three phase primaries on the transformer $T_1$ without heavy circulating currents. These three phase machine windings have their generated E. M. F.'s brought to a common time phase by the three phase time phase charging means $M_2$ and have the numerical value of their generated E. M. F. after phase changing, brought to a common numerical value by three phase E. M. F. changing means $P_2$.

The high voltage secondaries of transformers $T_1$ and $T_2$ are connected in series in E. M. F. additive relation. The E. M. F.'s induced in the high tension windings of $T_1$ and $T_2$ differ in time phase approximately 30 electrical degrees and they add vectorially.

Figure 2A:
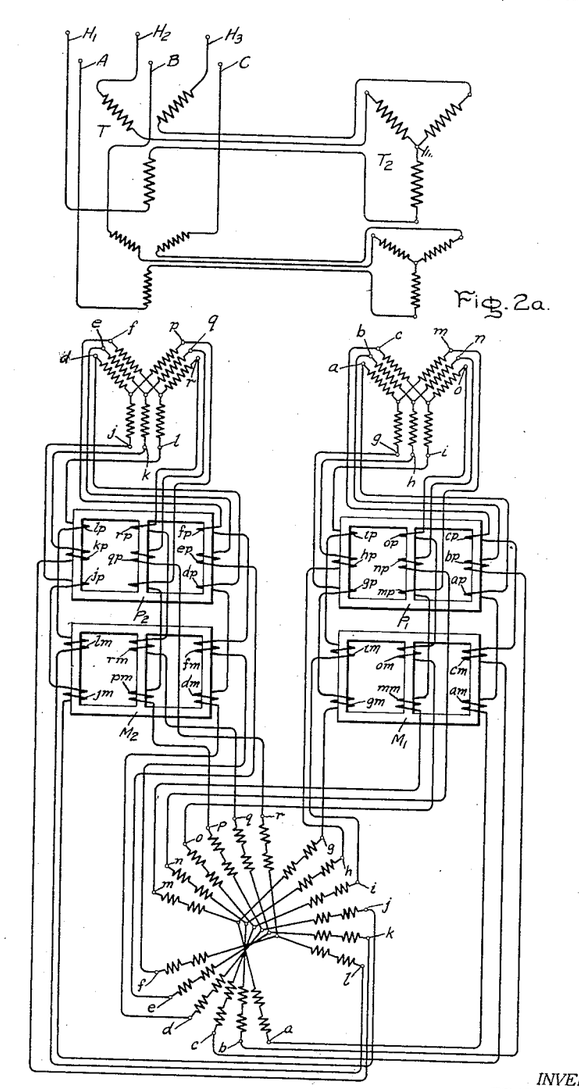

In Fig 2ª of the drawings I have shown very diagrammatically the general connections of the windings to facilitate an understanding of the circuit arrangements by a cursory examination of the drawings. For purposes of simplification the transformer cores have been omitted since the winding arrangement on the cores is shown in detail in Fig. 2. The generator winding is shown as comprising six independent three-phase circuits as in Fig. 2, with corresponding phase circuits designated as $a$, $b$, $c$, $d$, $e$, $f$; $g$, $h$, $i$, $j$, $k$, $l$, and $m$, $n$, $o$, $p$, $q$, $r$. The generator circuits $a$, $c$, $d$, $f$; $g$, $i$, $j$, $l$ and $m$, $o$, $p$, $r$ are connected through phase changing means $M_1$ and $M_2$ and voltage changing means $P_1$ and $P_2$, to transformers $T$ and $T_2$ having phase windings with terminal designations similar to the corresponding machine windings. The high voltage primary windings of $T$ and $T_2$ are connected in series to supply power to the three-phase high-voltage distribution circuit indicated by conductors $H_1$, $H_2$ and $H_3$. Similarly the tertiary windings of $T$ and $T_2$ are connected in series and connected to supply the circuit indicated by $A$, $B$ and $C$.

The above description covers only a few of the many arrangements whereby machine windings each generating, E. M. F. differing in time phase from the other, have E. M. F. time phases brought to a common E. M. F. time phase value by E. M. F. time phase changing means and where necessary and desired their E. M. F.'s after being changed in time phase are further brought to a common numerical value by voltage changing means. For instance it is evident that since the generated E. M. F.'s of all machine windings feeding primaries on a common magnetic circuit are brought to a common numerical E. M. F. value as well as to a common time phase value they may feed a single primary coil on said magnetic circuit all of said power circuits being connected in multiple.

On account of the multiplicity of generator windings feeding the corresponding multiplicity of primaries of the associated transformer bank for each generator in a power house, it may not be convenient to connect such machines directly in multiple. By reason of the very high voltage for which the secondaries of the associated transformers are usually wound, it is very expensive to equip for such switching on the secondary side of the transformers. I have shown in Figs. 1 and 2 tertiary windings $A_1$—$A_2$, $B_1$—$B_2$, $C_1$—$C_2$ and A B C respectively which tertiaries I propose to use for such multiple connections of machines. These tertiary windings may also be used for supplying power to station auxiliaries. In general, such a synchronizing voltage (not being limited by the conventional machine winding voltage which cannot be high on account of machine insulation and, for large machines, cannot be low on account of the necessity in such case of rupturing very great currents) may be chosen of such a value as to be best suited to the individual undertaking.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:—

1. In combination, a multipole electrical machine having a multiplicity of separately insulated three phase windings each differing from the others in the time phase of its generated E. M. F., a three phase transformer bank having as many separately insulated three phase primaries as there are separately insulated three phase machine windings, and phase changing means for bringing to a common time phase the E. M. F. of predetermined generator windings which are connected to predetermined three phase primary windings.

2. In combination, a multipole electrical machine having a multiplicity of separately insulated three phase windings each differing from the others in the time phase of its generated E. M. F., a three phase transformer bank having separately insulated three phase primary windings mounted on magnetic cores so that in any phase a magnetic core has a winding thereon connected to a plurality of machine windings of the same generated time phase, and phase changing means for bringing to a common time phase the voltage of said plurality of generator windings of different generated time phase which are connected to the smaller number of said transformer primary windings.

3. In combination, a multipole electrical machine having a multiplicity of separately insulated three phase windings each differing from the others in the time phase of its generated E. M. F., a three phase power circuit connected to be energized from said machine, and transformer time phase changing means interposed in series between each of said machine phase windings having generated E. M. F.'s differing slightly in time phase from the E. M. F.'s of the corresponding phase of said power circuit to which it is connected to bring the time phase of the E. M. F. generated in said machine phase winding to the time phase of the E. M. F. of said connected power phase.

4. In combination, a multipole electrical machine having a multiplicity of separately insulated three phase windings each differing from the others in the time phase of its generated E. M. F., a three phase transformer bank having a plurality of magnetic legs per phase and several primary windings per magnetic leg, said primary windings being connected to form as many separately insulated three phase primary windings as there are separately insulated three phase machine windings and each three phase machine winding being connected to feed its energy to a separately insulated three phase primary in separately insulated relation, and phase changing means connected in series with predetermined machine phase windings and predetermined primary windings for bringing the time phase of the E. M. F. generated in the machine windings to the same time phase.

5. In combination, a multipole electrical machine having a multiplicity of separately insulated three phase windings each differing from the others in the time phase of its generated E. M. F., an associated transformer bank having separately insulated three phase primary windings in number less than the number of said machine windings, said machine windings having generated E. M. F.'s of a predetermined time phase being connected to feed their generated energy to predetermined primary windings, and phase changing means connected in series with each machine winding having a generated E. M. F. differing slightly in time phase from said predetermined time phase for bringing the time phase of the E. M. F. generated in said last mentioned machine windings to the time phase of the E. M. F. of said machine windings of predetermined time phase.

6. In combination, a multipole electrical machine having a multiplicity of separately insulated three-phase windings each differing from the other in the time phase of its generated E. M. F., a three-phase power circuit connected to be energized from said machine windings, two of said machine windings having E. M. F.'s slightly lagging and slightly leading the E. M. F. of said power circuits respectively, and three-phase transformer time phase changing means having two equal turn coils per phase mounted on a common magnetic leg, one of said coils being connected in the corresponding phase of each of said two machine windings in such a manner that equal power currents fed by said machine phase windings to their connected power phase will produce M. M. F.'s in said phase changing coils equal and opposite.

7. In combination, a multipole electrical machine having two separately insulated alternating current windings arranged to generate E. M. F.'s differing from each other in time phase, a time changing transformer having two time phase changing coils on a common magnetic leg with one in series with each of said machine windings, said phase changing coils being so wound and connected that when said machine windings are feeding power currents of substantially common value and time phase the M. M. F.'s generated in said phase changing coils by said power currents neutralize each other.

8. In combination, a multipole electrical machine having uniformly distributed separately insulated alternating current coils so arranged as to have the E. M. F. generated in each of different time phase, and means for bringing the E. M. F. generated in any two selected windings to a common time phase value midway in time phase between the time phase values of the E. M. F. generated in each winding.

9. In combination, a three phase transformer bank having a plurality of magnetic circuits per phase and several primary windings common to each of said magnetic circuits, a multipole electrical machine connected to energize said transformer and having as many separately insulated windings per phase as there are primary windings per phase, said machine windings in any phase having generated E. M. F.'s of most nearly the same time phase feeding primaries on one magnetic circuit, and transformer time phase changing means for bringing to the same time phase the generated E. M. F.'s of said machine windings feeding primary windings having a common magnetic circuit.

10. In combination, a multipole electrical machine having two separately insulated alternating current windings generating E. M. F.'s differing from each other in the time phase, a time phase changing transformer having two time phase changing coils on a common magnetic leg with one in series with each of said machine windings and being so wound and connected that when said machine windings are feeding power currents of substantially common value and time phase the M. M. F.'s generated in said phase changing coils by said power currents neutralize each other, and a transformer bank having two primary windings with a common magnetic circuit and each connected to one of said machine windings, said phase changing coils and transformer primary windings being suitably connected in series to form a separately insulated circuit.

11. In combination, a multipole electrical machine having two separately insulated alternating current windings generating E. M. F.'s differing from each other in time phase, a time phase changing transformer having two equal turn time changing coils on a commons magnetic leg and having one in series with each of said machine windings, said phase changing coils being so wound and connected that that coil which is in series with that machine winding whose generated E. M. F. leads in time phase will act as a transformer primary to retard the time phase generated in its connected machine windings and that coil which is in series with that machine winding whose generated E. M. F. lags in time phase will act as the transformer secondary to accelerate the time phase generated in its connected machine winding.

12. A multipole electrical machine having a multiplicity of uniformly distributed separately insulated alternating current windings and phase changing means provided with a magnetic core connected to all of said machine windings generating E. M. F.'s of very nearly the same time phase for bringing their time phase displacement with respect to each other reduced to substantially zero and thereby to a mean time phase, said machine windings having generated E. M. F.'s lagging said mean time phase being connected to pass their generated power currents around said magnetic core in one direction while all windings having generated E. M. F.'s leading said means time phase being connected to pass their generated power currents around said magnetic core in the opposite direction.

13. In combination, a multipole machine having a multiplicity of separately insulated machine windings, a transformer connected to said machine, each of said machine windings feeding a primary winding of said transformer in separately insulated relation, a power transmission circuit, a high-voltage secondary winding on said transformer connected to said power transmission circuit, and a tertiary winding on said transformer arranged for providing parallel operation interconnecting means.

14. In combination, a multipole electrical machine having a multiplicity of separately insulated three phase windings each differing from the others in the time phase of its generated E. M. F., a three phase transformer bank having as many separately insulated three phase primary windings as there are separately insulated three phase machine windings, and voltage modifying means for bringing the time phase and magnitude of the generated E. M. F. of each machine winding in one phase connected to predetermined transformer primary windings to the same time phase and magnitude.

15. In combination, a multipole electrical machine having a multiplicity of separately insulated three phase windings each differing from the others in the time phase of its generated E. M. F., a three phase transformer bank having as many separately insulated three phase primary windings as there are separately insulated three phase machine windings, transformer time phase changing means interposed between predetermined machine windings and predetermined primary windings, and transformer means interposed between predetermined phase changing means and predetermined transformer primary windings for bringing the magnitude of the voltages impressed across said predetermined primary windings to the same value.

In testimony, that I claim the invention set forth above I have hereunto set my hand this 11th day of February, 1928.

FRAZER W. GAY.